(12) United States Patent
Welchko et al.

(10) Patent No.: US 7,556,082 B2
(45) Date of Patent: Jul. 7, 2009

(54) INTERIOR PERMANENT MAGNET ROTORS WITH MULTIPLE PROPERTIES AND METHODS OF MAKING SAME

(75) Inventors: Brian Welchko, Torrance, CA (US); Constantin C. Stancu, Anaheim, CA (US); Gregory S. Smith, Woodland Hills, CA (US)

(73) Assignee: GM Global Technology Operations, Inc., Detroit, MI (US)

(\*) Notice: Subject to any disclaimer, the term of this patent is extended or adjusted under 35 U.S.C. 154(b) by 492 days.

(21) Appl. No.: 11/392,252

(22) Filed: Mar. 29, 2006

(65) Prior Publication Data

US 2007/0228862 A1    Oct. 4, 2007

(51) Int. Cl.
*B22D 19/16* (2006.01)
(52) U.S. Cl. .......................... 164/96; 164/95
(58) Field of Classification Search .............. None
See application file for complete search history.

(56) References Cited

U.S. PATENT DOCUMENTS

| | | | |
|---|---|---|---|
| 5,187,401 A | 2/1993 | Rahman | |
| 5,369,325 A * | 11/1994 | Nagate et al. | 310/156.54 |
| 5,397,975 A | 3/1995 | Syverson | |
| 5,751,089 A | 5/1998 | Stridsberg | |
| 6,177,745 B1 | 1/2001 | Narita et al. | |
| 6,248,095 B1 | 6/2001 | Giambattista et al. | |
| 6,684,483 B2 | 2/2004 | Rahman et al. | |
| 6,703,746 B2 * | 3/2004 | Biais et al. | 310/156.53 |
| 6,907,304 B1 | 6/2005 | Hintz et al. | |
| 2003/0193260 A1 * | 10/2003 | Reiter et al. | 310/217 |

\* cited by examiner

*Primary Examiner*—Kuang Lin

(57) ABSTRACT

An armature for use in an electric traction motor comprises a rotor having a central portion and a peripheral portion with the peripheral portion having a plurality of cavities. Permanent magnets solidified from liquid magnetic material are disposed in the cavities to form poles of the rotor with at least a portion of the cavities having directly abutting permanent magnets comprised of at least first and second magnetic materials of different properties injected in liquid or mobile form into single cavities. In interface regions between the at least first and second magnetic materials the first and second magnetic materials are intermingled to form a transition zone. A method of making the armature includes injecting the magnetic materials simultaneously as well as injecting a subsequent magnetic material when the initial magnetic material is still fluidly mobile.

10 Claims, 4 Drawing Sheets

INTERIOR PERMANENT MAGNET ROTORS WITH MULTIPLE PROPERTIES AND METHODS OF MAKING SAME

FIELD OF THE INVENTION

The present invention relates to interior permanent magnet rotors with multiple properties and methods for making same. More particularly, the present invention relates to such rotors configured for use in electric motors used in electric or hybrid vehicles, or in electric motors used for other purposes.

BACKGROUND OF THE INVENTION

The type and strength of magnetic material in different regions of a rotor used in electric motors may be varied. For example in U.S. Pat. No. 6,703,746, NdFeB is used to configure in the entire outer barrier of the rotor where it may be easily magnetized. However, in this patent high energy magnetic material in the middle section or the inner regions of the rotor are not exposed to a magnetizing field strong enough to fully magnetize high energy magnetic material. Consequently, low energy magnetic material is placed in areas of the rotor that are difficult to magnetize because low energy magnetic materials require a smaller magnitude magnetizing field than high energy magnetic materials. Accordingly, low energy magnetic material in the inner region may be fully magnetized. Low energy magnets in the inner region do not contribute to the air gap flux. However, the low energy magnets ensure bridge saturation, which is important to ensure high saliency corresponding to better performance. A non-magnetized high energy magnet in the inner region may contribute to a waste of valuable magnetic material as well as to inadequate bridge saturation. Inadequate bridge saturation can lower the rotor saliency and motor performance.

In U.S. Pat. No. 6,703,746, the high energy and low energy magnetic materials are injected in liquid form into separate cavities within the rotor with the high energy magnetic material being injected into outer cavities adjacent the periphery of the rotor and low energy magnetic material being injected into inner cavities closer to the axis of the rotor. When the liquid magnetic material solidifies, it is magnetized by the stator or other source of magnetization. In the arrangement of U.S. Pat. No. 6,703,746, each magnetic material in a cavity is consistent with an unmixed interface therebetween.

The design of an IPM motor is a series of tradeoffs to meet system objectives while minimizing unwanted side effects of the design. Torque ripple and losses within a rotor are two such unwanted side effects. Eddy current losses within a magnet in the motor contribute to the heating of the rotor. Segmenting sintered magnets along the axial length of the rotor is often employed to minimize the eddy current losses and thus rotor heating. Torque ripple can be minimized by careful shaping of the rotor magnets (thinner towards rotor surface) and/or skewing either the rotor or stator to smooth out air gap flux along the length of the motor. Skewing reduces the average torque production and complicates the manufacturing of the motor. Eddy current losses may be minimized by creating an additional mechanical bridge in the rotor so that a small portion of the cavity near the rotor surface can be left unfilled with magnet material. Since magnet material nearest the surface of the rotor contributes significantly to torque ripple and AC flux contributes to eddy currents, such techniques reduce both torque ripple and eddy current losses. Magnetic material nearer the surface of the rotor is easier to magnetize when the entire rotor is magnetized as one assembly, therefore placing stronger magnets near the rotor surface and weaker magnets deeper inside the rotor is a cost savings measure. There is a need, however, to make such arrangements of magnetic material as efficient as possible.

SUMMARY OF THE INVENTION

An armature for use in an electric traction motor comprises a rotor having a central portion and a peripheral portion with the peripheral portion having a plurality of cavities. Permanent magnets solidified from liquid magnetic material are disposed in the cavities to form poles of the rotor. At least a portion of the cavities have directly abutting permanent magnets comprised of at least first and second magnetic materials of different properties that are injected while both are in liquid or at least mobile form, which magnetic materials together solidify in each cavity. This results in an interface region between the first and second magnetic materials in which the first and second materials mix with one another along a common interface region within each cavity.

In a further aspect, there is at least a third magnetic material in each cavity of the rotor.

In still a further aspect, the magnetic materials are Nd FeB and ferrite.

In still a further aspect, the selected cavities have a substantially radial component with respect to the rotor, the magnetic properties of the variable property permanent magnetic varying in a radial direction with respect to axis the rotor.

In a further aspect, the selective cavities have an axial extent with respect to the rotor and the magnetic properties of the variable property permanent magnetic vary in an axial direction with respect to the rotor.

A method of fabricating a rotor to form an armature for an electric traction motor comprises first providing the rotor with cavities adjacent its periphery. First and second magnetic materials having different properties are injected while both are simultaneously in liquid form into first and second portions of the cavity. When the magnetic materials are allowed to solidify, the cavity has both the first and second magnetic materials concentrated in separate regions thereof with an interface region with a mixture of the first and second materials.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
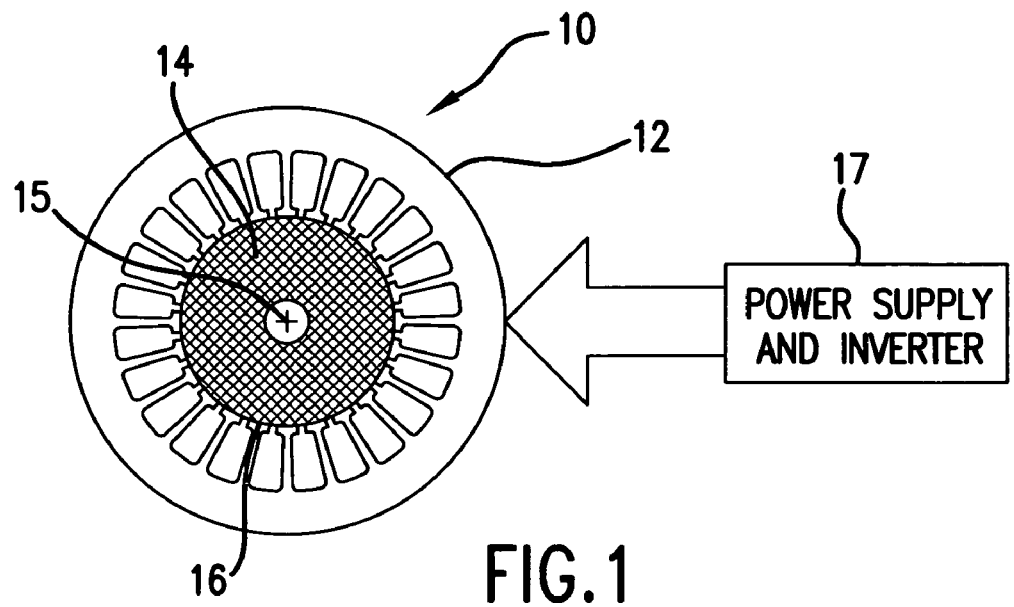
FIG. 1 is a diagrammatic cross-sectional drawing of a permanent magnetic motor and control system.

FIG. 1 is a diagrammatic drawing of a permanent magnet motor 10 having a wound stator 12 and a permanent magnet rotor 14. The rotor 14 is formed around a longitudinal axis 15 and a peripheral surface 16. A power supply and inverter 17 communicate and control the speed and torque of the motor 10 in response to feedback including, but not limited to, an encoder, resolver, tachometer, proximity switch and tooth set, and back electro-motive force (emf) detection. The motor 10 may be characterized as a brushless DC motor with square wave or sinewave excitation provided by the power supply and inverter 17.

Figure 2:
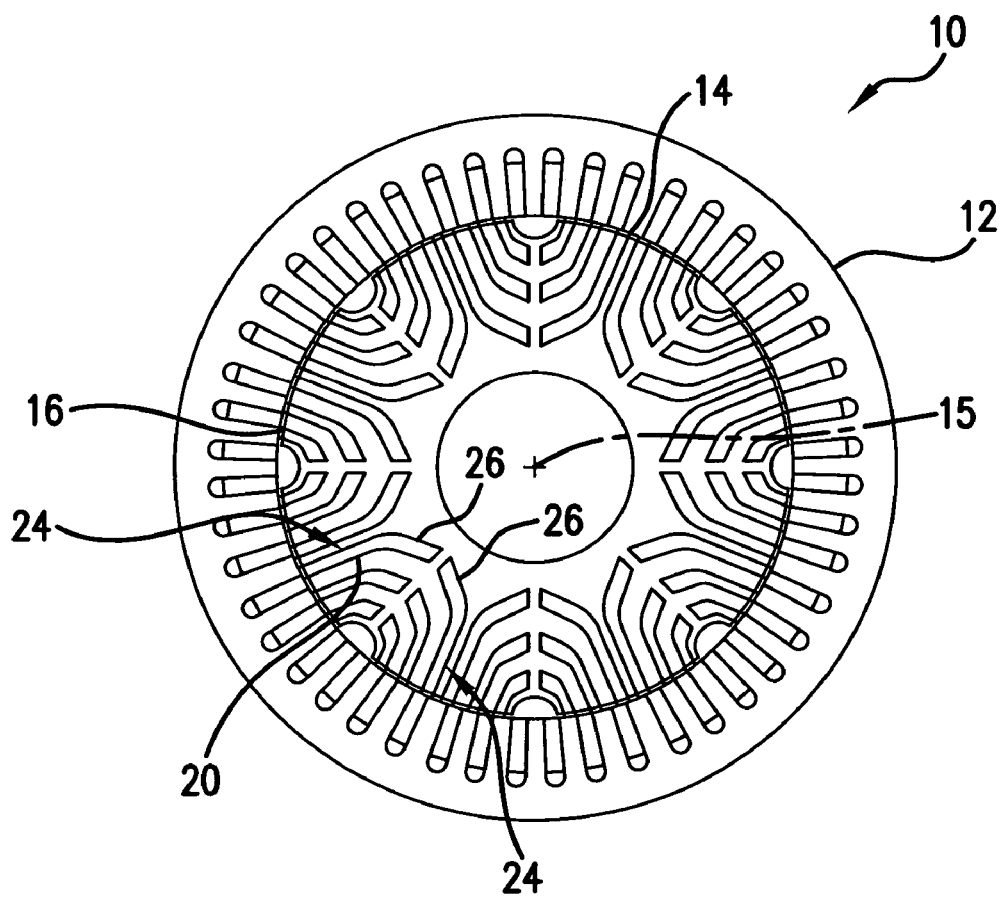
FIG. 2 is a cross-section of a multi-layer interior or buried magnetic motor geometry.

FIG. 2 is a cross-section of a prior art multi-layer or barrier buried magnet rotor geometry. Permanent magnets 20 are defined by regions 26 of magnetic material layers or barriers 24 that are difficult to fully magnetize because of a relatively long distance from the peripheral surface 16 of the rotor 14. The surface of the magnetic material layers 24 are magnetized by a magnetizing fixture or by the wound stator 12 during a post-magnetization process. The post-magnetization process in one embodiment of the present invention includes positioning a magnetizing fixture around the rotor 14 to magnetize the magnetic material in the rotor. Magnetizing fixtures are similar to the stator 12 and contain windings which are used for the magnetization process. In alternate embodiments of the present invention, the stator 12 may itself be used to magnetize the rotor 14 instead of using a magnetizing fixture. The magnetizing fixture includes enough iron to prevent it from becoming saturated. Windings in the magnetizing fixture are placed such that the magnetic field is guided along a desired magnetization direction.

Figure 3:
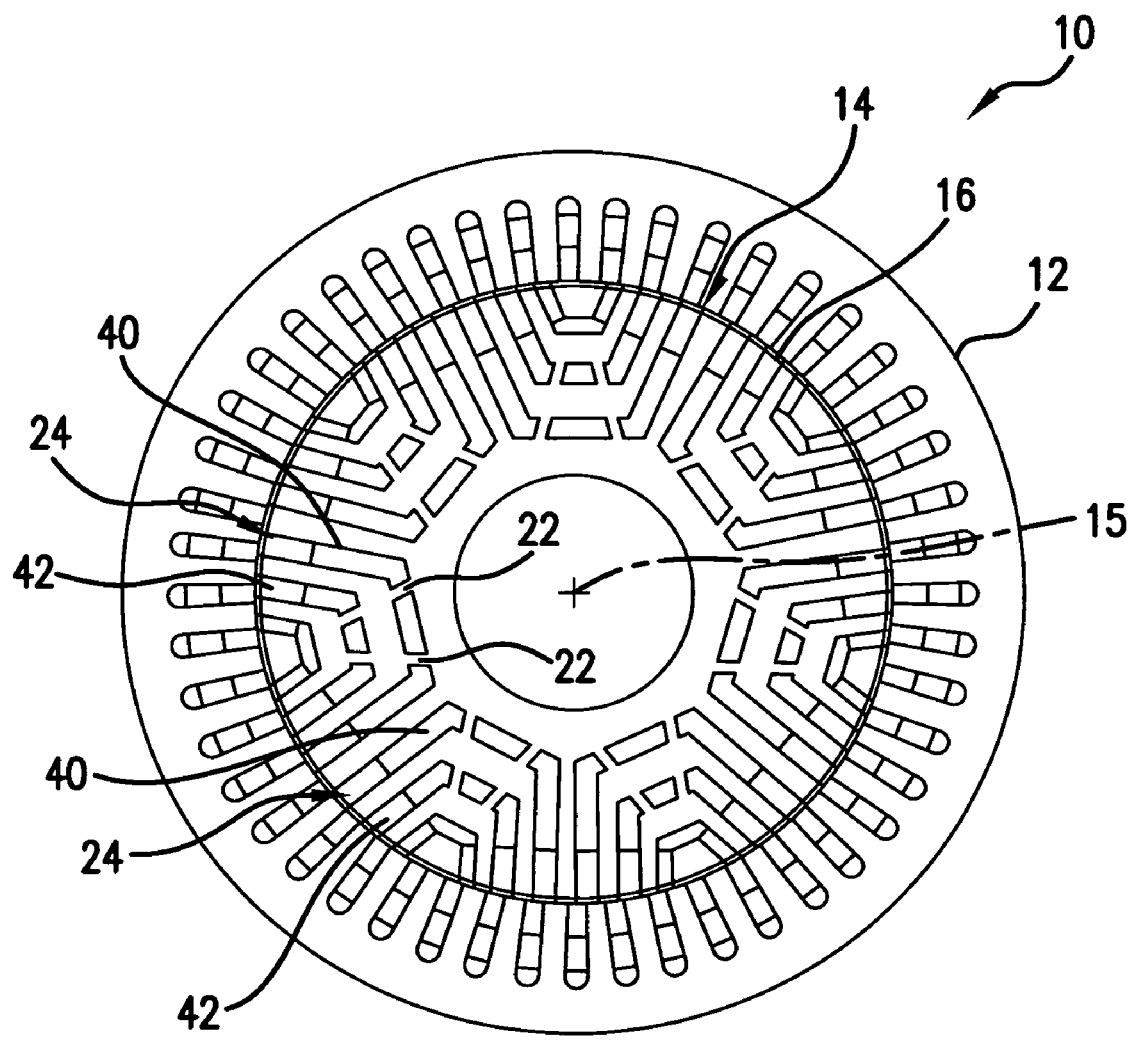
FIG. 3 is a cross-section of a multi-layer interior or buried magnetic motor with bottom barriers filled with low energy magnetic material and upper barriers filled with high energy magnetic material.

FIG. 3 is a cross-section of a rotor similar to FIG. 2 in which magnetic powder mixed with plastic is injected into the rotor 14 cavities under high temperature and pressure, allowing the material to bond and form to a solid magnet inside the rotor 14 cavity upon curing. This process is desirable for large scale production. As mentioned earlier, post-magnetization of high energy magnetic material is currently only practical if the magnetic material is buried near the rotor surface.

Magnetic material 24, depending on its composition, requires varying magnetic field strengths to become fully magnetized. The high energy magnets 20 which are preferred for variable speed motor drive applications due to their higher demagnetization strength, require very high magnetic fields to saturate the magnetic material 24 to become fully magnetized. The magnetic field is produced by the flow of current in the winding of the stator 12 or in a magnetizing fixture. Usually, a very high current burst is needed for a very short period of time to magnetize the rotor 14. If the stator 12 lacks sufficient iron, it may become saturated during this process, preventing the generated magnetic field from penetrating into the rotor 14.

As described previously, multi-layer or barrier geometry for an IPM rotor improves the saliency of the rotor 14. Accordingly, the geometry of the rotor 14 shown in FIG. 2 has the advantage of having relatively high saliency, improving the machine torque density and lowering the magnetic material volume requirements for a specific torque or wattage motor rating. Lower magnetic material volume requirements reduce the motor cost and also alleviate the problems associated with high flux PM machines, such as short circuit and open circuit fault problems, and spin losses (eddy current induced losses) due to the presence of the permanent magnetic field.

FIG. 3 is a cross section of a multi-layer or barrier buried magnet motor 10 with bottom barriers of the magnets 20 disposed closer to the axis 15 of the rotor 14 filled with low energy magnetic material 40 and upper barriers of the magnets filled with high energy magnetic material 42. In the present invention, high energy magnetic material is removed from areas of the rotor 14, such as regions 26 in FIG. 2, where it is difficult to magnetize the high energy magnetic material with a low energy magnetic material. The high energy magnetic material 42 may comprise a material requiring a magnetizing field more than 2000 kA/m to become magnetized. The low energy magnetic material 40 may comprise a material requiring a magnetizing field less than 2000 kA/m. Low coercivity of the low energy magnetic material 40 allows easier magnetization. In the preferred embodiment of the present invention, the high energy magnetic material 42 is NdFeB and the low energy magnetic material 40 is ferrite, but any other high energy or low energy magnetic material is considered within the scope of the present invention.

The low energy magnetic material 40 placed nearer to center of the rotor 14 can be fully magnetized by the magnetizing fixture because of its lower magnetizing field. The main performance contribution of the magnetic material 40 is to saturate the bridges 22 between barriers 24 and therefore ensure the saliency of the rotor 14. These bridges 22 also ensure the mechanical strength of the rotor 14. The mechanical strength of the low magnetic material 40 that is placed near the center of the rotor is sufficient to fulfill this function.

Figure 4:
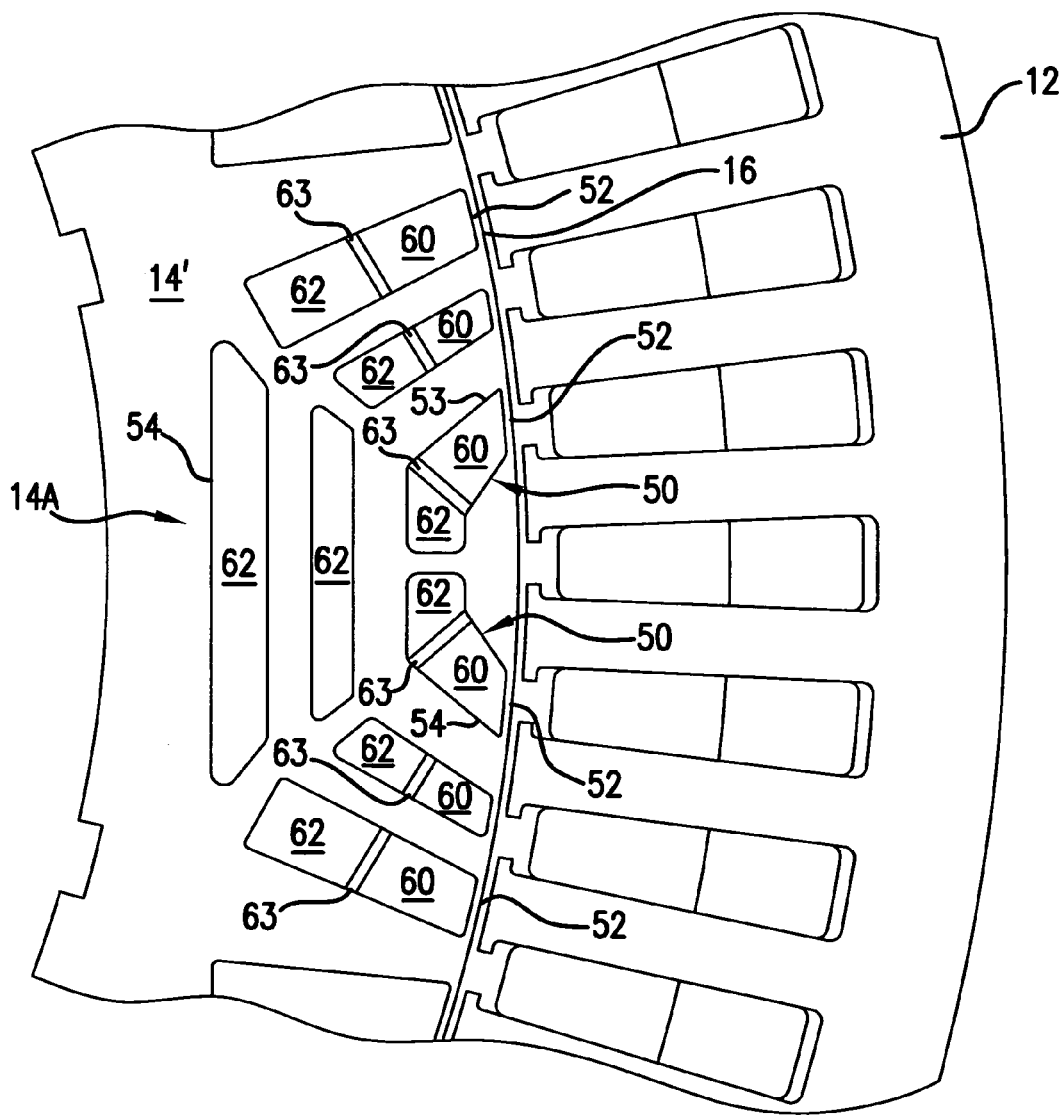
FIG. 4 is a view similar to FIGS. 1-3, but showing single cavities some of which have at least two magnetic materials therein, and in accordance with the principles of the present invention the two magnetic materials have been injected while simultaneously in liquid form to produce an interface region in which the two magnetic materials intermix.

Referring now to FIG. 4 where a portion 14A of a rotor 14 is shown, the use of multiple property injection molded magnets 50 as discussed in the prior art of FIGS. 1-3, offers the designer additional degrees of freedom to optimize machine design. One area of concern are mechanical rotor bridges 52. Since rotor bridges 52 provide leakage paths, it is desirable that the rotor iron comprising the bridges is magnetically saturated so that leakage flux is minimized. Strong magnets in the vicinity of the rotor bridges 52 increase the localized saturation of the bridges and help achieve this goal. However, the magnet strength to saturate the bridges 52 may be too strong to meet the system objectives if used in the entire cavity.

In FIG. 4 the magnets 50 are multiple property magnets injected in liquid form or mobile (i.e., flowable plastic) form into rotor cavity segments 53 and 54 so as to control the localized saturation of the rotor bridges 52, while the magnets 54 are single property injection magnets. In FIG. 4, magnet portions 60 and 62 having different properties (i.e., different magnet strength, temperature stability, etc.) are injected into rotor cavity segments while both magnetic materials are in liquid form. Since the magnet portions 60 and 62 are injected while both portions are in liquid form, some mixing occurs at the interface regions 63. This results in the magnets 50 having a smooth transition of magnetic properties along the radial extent of the magnets. Consequently, when the magnetic portions 60 and 62 are injected while both portions a still in a liquid or mobile form, or are injected simultaneously, the magnetic portions are in the cavity 53 and 54 segments intermingle in the interface region 63.

Preferably, the first magnetic material 60 is a relatively high energy material, such as Nd Fe B, and the second material 62 is a relatively low energy material, such as ferrite, with the materials in the interface region being a mixture of NdFeB and ferrite. By varying the strength and/or thermal properties of magnetic cavities in a radial direction away from the periphery 16 and toward the rotor axis 15 (see FIGS. 1 and 2), magnetic saturation is controlled in the radial steel sections of which the rotor is configured affording the designer increased flexibility in configuring the rotor 14.

Figure 5:
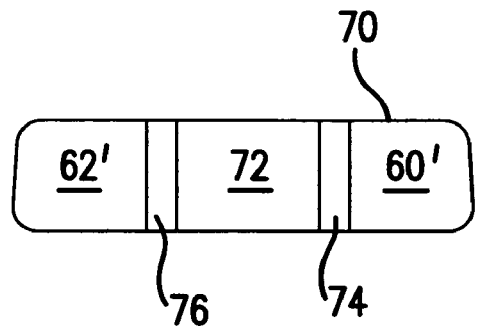
FIG. 5 is a view of a single cavity in a rotor similar to that of FIGS. 1-3 wherein a third material is injected into a cavity, the materials being separated by two interface regions with intermixtures of magnetic materials therein.

FIG. 5 illustrates another embodiment of the invention wherein a cavity 70 has a third magnetic material 72 injected between a first magnetic material 60' and second magnetic material 62'. Disposed between the first magnetic material 60' and the third magnetic material 72 is a second interface region 74 and disposed between the second magnetic material 62' and the third magnetic material 62' and the third magnetic material 74 is a third interface region 76. The second and third interfaces regions 74 and 76 are two in number, whereas the first interface region 63 of FIG. 4 is one in number. As with the first interface region 63 of FIG. 4, the third magnetic material 72 is injected into the cavity 70 while the first and second materials 60' and 62' are in liquid or mobile (i.e., flowable plastic) form and are mobile enough to intermingle with the third material 72. Consequently, the second and third interface regions 74 and 76 provide a smooth transition zone between the three magnetic materials in the cavity 70. In FIG. 5, the transition of magnetic material 60' to the second magnetic material 62' is made smoother by the third magnetic material 72 and smoother still by the interface regions 74 and 76.

Figure 6:
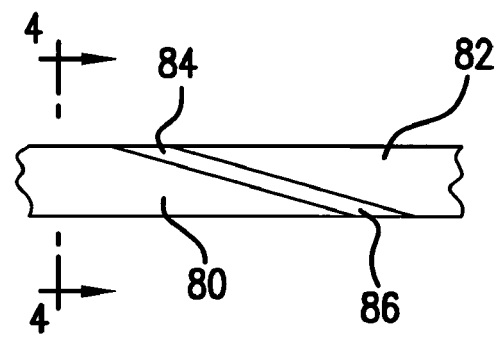
FIG. 6 is a view of a single cavity in a rotor similar to FIG. 4 wherein injected magnetic materials vary over axial length of the rotor with an interface region of mixed material therebetween.

Referring now to FIG. 6, the magnetic properties of the magnetic materials 80 and 82 are in another embodiment varied along the axial length of a rotor 14' as is shown by the axial cavity 84. Between the magnetic materials 82 and 82" is an interface region 86 where the magnetic materials 80 and 82 intermingle to smooth transition between the materials. This arrangement skews the rotor 14 electromagnetically so that it is not necessary to physically arrange rotor laminations.

Figure 7:
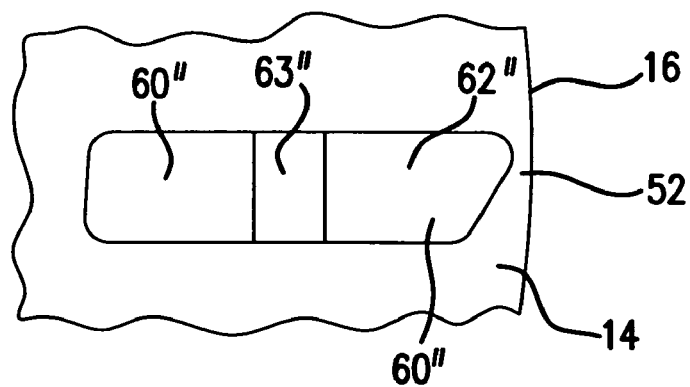
FIG. 7 is a view of a single cavity in a rotor similar to FIG. 4 wherein injected magnetic material is varied near the peripheral surface of the rotor.

In FIG. 7, the magnetic properties are varied near the peripheral surface 16 of the rotor 14 by mixing some magnetic material 60" with magnetic material 62". This is still an interface region 63" between magnetic material 62" and the mixed region adjacent the periphery 16 of the rotor 14. This arrangement decreases torque ripple associated with the slotting effect between the rotor and stator 12, while simultaneously insuring desirable bridge saturation deeper within the rotor. By controlling saturation on a localized basis, reluctance torque availability is increased resulting in an increased motor torque and power density.

While this invention has been described in terms of some specific embodiments, it will be appreciated that other forms can readily be adapted by one skilled in the art. Accordingly, the scope of this invention is to be considered limited only by the following claims.

From the foregoing description, one skilled in the art can easily ascertain the essential characteristics of this invention, and without departing form the spirit and scope thereof, can make various changes and modifications of the invention to adapt it to various usages and conditions.

We claim:

1. A method of fabricating a rotor to form an armature for an electric traction motor wherein the rotor has a periphery and cavities adjacent the periphery, the method comprising:
    injecting into a first portion of the cavities a first magnetic material in liquid or mobile form, the first magnetic material having a first magnetic property;
    while the first magnetic material is still in liquid or mobile form injecting into a second portion of the cavities at least a second magnetic material having a second property, different from the first property, wherein selected cavities have both the first and second magnetic materials therein with an interface region between the first and second magnetic materials, and allowing the magnetic materials to solidify with the interface region having both materials intermingled in the interface region.

2. The method of claim 1 wherein the magnetic materials differ in magnetic strength or temperature stability.

3. The method of claim 1 wherein the first magnetic material is Nd Fe B and the second magnetic material is ferrite.

4. The method of claim 3 wherein the cavities are formed in the armature with a first portion adjacent the periphery of the rotor and a second portion formed inboard of the first portion and wherein the Nd Fe B is injected in the first portion and ferrite is injected into the second portion.

5. The method of claim 1 wherein the magnetic material is injected in cavity portions disposed at separate radial distances from the periphery of the rotor.

6. The method of claim 5 wherein there are high energy and low energy magnetic materials, the high energy magnetic materials being injected into a cavity portion proximate the periphery of the rotor and the low energy magnetic material being injected into a cavity portion inboard of the high energy magnetic materials.

7. The method of claim 6 wherein the cavities are formed in the armature with a first portion adjacent the periphery of the rotor and a second portion formed inboard of the first portion, and wherein the Nd Fe B is injected into the first portion and ferrite is injected into the second portion.

8. The method of claim 1 further including injecting with the first and the second magnetic material a third magnetic material in liquid or mobile form at a location between the first and second magnetic materials to create a third region, the third region being separated from the first and second magnetic materials by interface regions in which magnetic materials are mixed and remain mixed as the materials solidify.

9. The method of claim 8 wherein the first, second and third magnetic materials are injected simultaneously.

10. The method of claim 1 wherein the first and second magnetic materials are injected simultaneously.

* * * * *